Oct. 14, 1958    H. D. SEIGLE ET AL    2,856,061
HYDRAULIC CONVEYOR TAKE-UP
Filed March 1, 1954    4 Sheets-Sheet 1
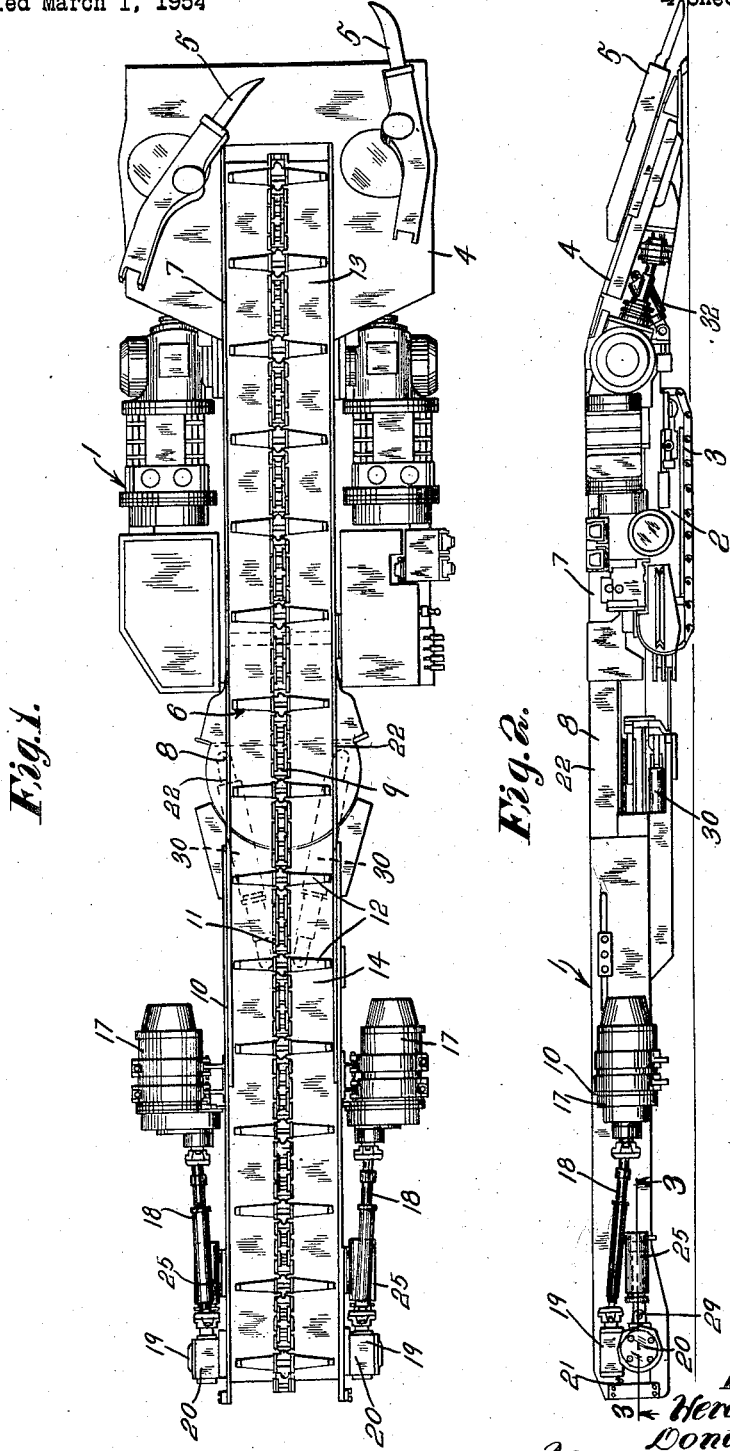

Oct. 14, 1958  H. D. SEIGLE ET AL  2,856,061
HYDRAULIC CONVEYOR TAKE-UP

Filed March 1, 1954

Inventors:
Herald D. Seigle.
Donald D. Ziegler.
by Charles F. Osgood,
Attorney.

Inventors:
Herald D. Seigle.
Donald D. Ziegler.
by Charles F. Osgood,
attorney.

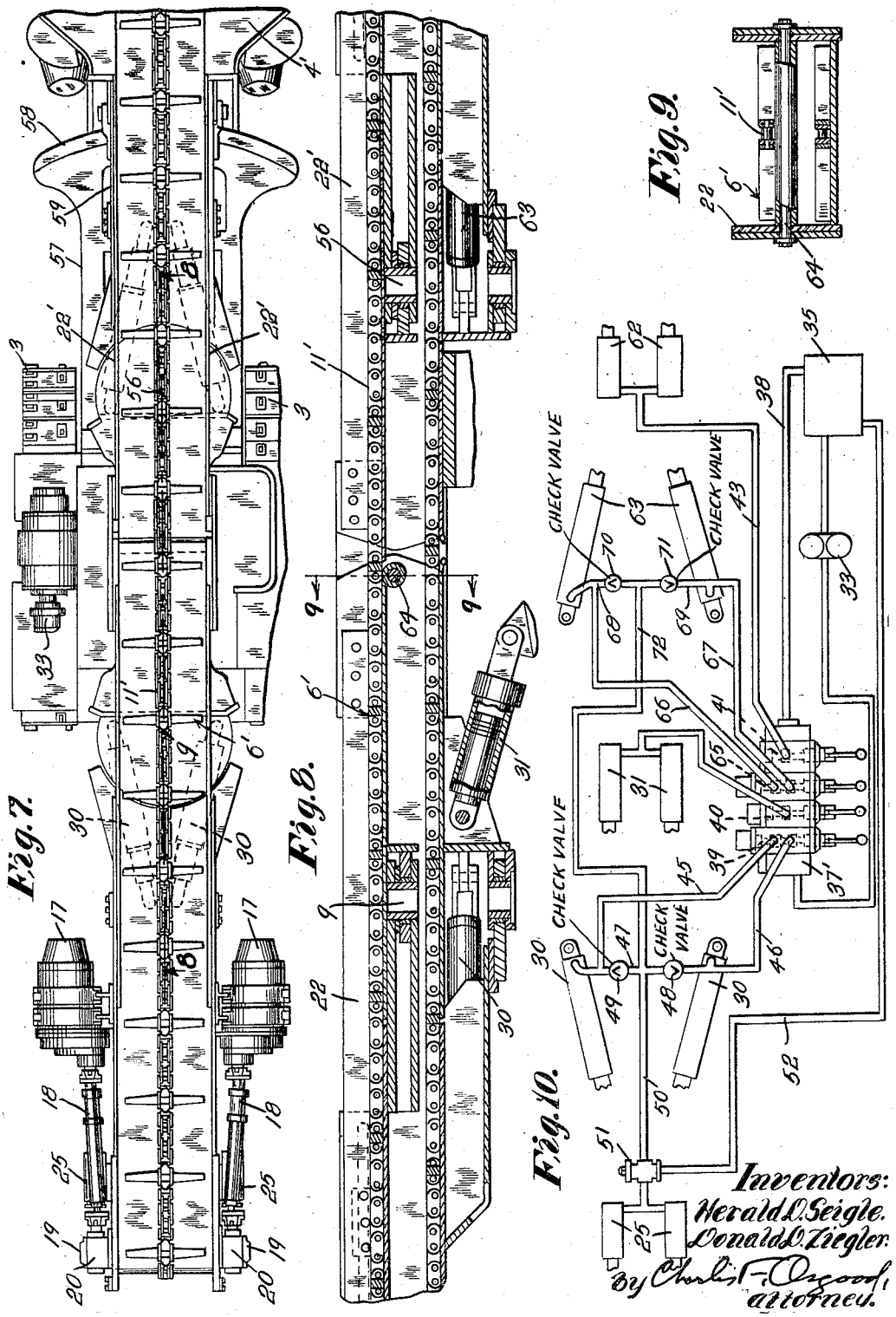

United States Patent Office 2,856,061
Patented Oct. 14, 1958

2,856,061

HYDRAULIC CONVEYOR TAKE-UP

Herald D. Seigle, Franklin, and Donald D. Ziegler, Van, Pa., assignors to Joy Manufacturing Company, Pittsburgh, Pa., a corporation of Pennsylvania Application March 1, 1954, Serial No. 413,120

8 Claims. (Cl. 198—109)

This invention relates to conveyors and more particularly to endless chain, flight conveyors especially designed for use with mobile loading machines whereby when the conveyor is swung laterally any slack introduced in the conveyor chain is automatically taken up.

In known types of conveyor apparatus either or both ends of the conveyor may be swung laterally and this is especially so in a mobile loading machine wherein either the rear discharge end or the front receiving end of the conveyor at the loading head, or both ends of the conveyor, may be swung laterally to vary their operating positions and in a conveyor of the endless chain, flight type, slack is introduced in the conveyor chain as the conveyor is swung laterally which must be automatically taken up as swinging takes place to provide for proper tension of the conveyor. Heretofore such taking up of the slack in the conveyor chain has been effected by spring devices, cam and push rod devices, fluid operated cylinder and piston devices and the like, and the present invention contemplates improvements over such known types of devices in that the slack in the conveyor chain is automatically taken up in an effective and in a relatively smooth, reliable and simple manner.

An object of the present invention is to provide an improved conveyor of the laterally swingable, endless chain type. Another object is to provide an improved fluid operated take-up device associated with the chain conveyor for automatically taking up any slack introduced in the conveyor chain as the conveyor is swung laterally. Still another object is to provide improved hydraulically operated take-up devices for the chain of an endless flight conveyor at one end of the latter for automatically taking up any slack introduced in the conveyor chain as the conveyor is swung laterally at either one or both of its ends. A further object is to provide improved take-up means embodying improved cylinder and piston devices and an improved hydraulic fluid system associated therewith.

In the accompanying drawings there are shown for purposes of illustration two forms which the invention may assume in practice.

In these drawings:

Fig. 1 is a plan view and Fig. 2 is a side view of a mobile loading machine in which a preferred illustrative embodiment of the invention is incorporated.

Fig. 7 is a plan view of the conveyor shown in Figs. 5 and 6, with the forward portion of the conveyor broken away.

Fig. 8 is an enlarged view in central longitudinal vertical section taken on line 8—8 of Fig. 7.

Fig. 9 is a cross section taken on line 9—9 of Fig. 8.

Fig. 10 is a diagrammatic view of the hydraulic fluid system of the modified embodiment.

Figure 3:
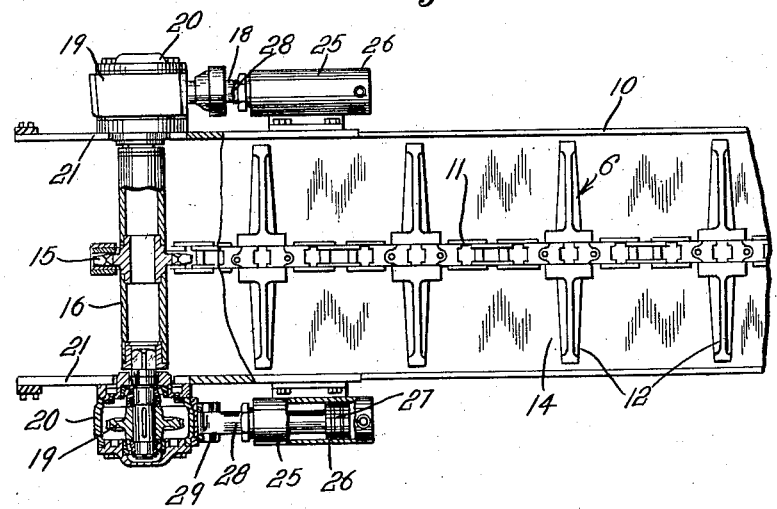
Fig. 3 is an enlarged horizontal sectional view taken on line 3—3 of Fig. 2, showing details of the hydraulic take-up.

In the illustrative embodiment of the invention shown in Figures 1 to 4 inclusive the improved take-up is shown incorporated in a mining machine as for example a mobile loading machine, generally designated 1, comprising a tractor base 2 provided with endless crawler treads 3 which may be driven separately or simultaneously to effect propulsion and steering of the machine, in a well-known manner. Carried by this base is a tiltable loading head 4 embodying conventional oscillatory gathering arms 5 for gathering loose material on the mine floor and for moving the material so gathered onto the forward receiving portion of an endless conveyor of the chain, flight type, generally designated 6. This conveyor comprises a forward troughlike frame 7 which extends forwardly along the tiltable loading head 4 and this loading head is tiltable about its pivot to vary the elevation of the forward receiving portion of the conveyor, in a well-known manner. The rearward portion 8 of the troughlike rear frame 7 of the conveyor is tiltable in a conventional manner and pivotally mounted on its rear portion to swing about a vertical axis at 9 is a laterally swingable rear troughlike frame portion 10. The endless conveyor 6 extends along the length of the troughlike frames 7 and 10 as shown in Fig. 1 and comprises a central drive chain 11 of the universally flexible type whose elements have fixed thereto at spaced intervals along the length of the chain transverse conveyor flights 12. The flights of the endless conveyor move along the bottoms 13 and 14 of the troughlike frames 7 and 10 and at its rearward portion pass around a rear drive sprocket 15 secured to a cross shaft 16 which is driven by motors 17 carried at the sides of the swingable conveyor frame 10 (Figs. 1 and 2). These motors are operatively connected to the cross shaft through usual telescopic shaftings 18 and speed reducing gearings 19. This cross shaft is suitably journaled in bearings supported within gear housings 20 which enclose the speed reducing gearings and these gear housings are slidingly guided in longitudinal guideways 21 at the rearward portion of the swingable rear conveyor frame 10. Arranged vertically at the sides of the pivot 9 are flexible side portions or plates 22 which provide continuations of the sides of the troughlike conveyor frames 7 and 10 and these side plates are adapted to flex or bend laterally as the rear conveyor frame is swung laterally about its pivot 9 and as these plates flex or bend the conveyor chain has slack introduced therein which must be taken up to provide for proper tension of the conveyor. The loading machine disclosed may be of the same general type as that shown in the John Merck Patent No. 2,613,800, dated October 14, 1952, owned by the same assignee as the present invention.

In accordance with the present invention, arranged longitudinally at opposite sides of the rear portion of the rear swingable conveyor frame 10 are fluid jacks 25 comprising cylinders 26 containing reciprocable pistons 27 having piston rods 28 projecting rearwardly from the rear cylinder heads. These piston rods are pivotally connected at 29 to the gear housings 20. When liquid under pressure is supplied to the inner ends of the jack cylinders 26 the pistons 27 are moved rearwardly moving the gear housings rearwardly in unison along the guideways 21 thereby to move the drive sprocket 15 rearwardly to take up any slack in the conveyor chain 11 to maintain the desired chain tension. When liquid is vented from the jack cylinders the pistons may retract to relieve the tension on the conveyor chain.

Figure 4:
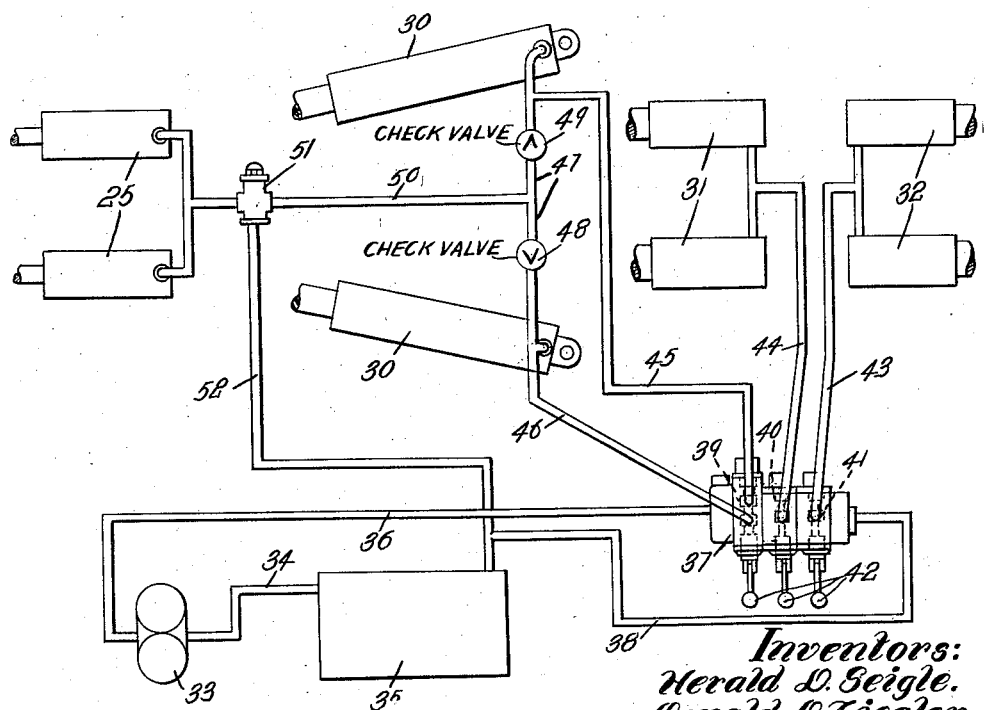
Fig. 4 is a diagrammatic view of the hydraulic fluid system.
Figure 5:
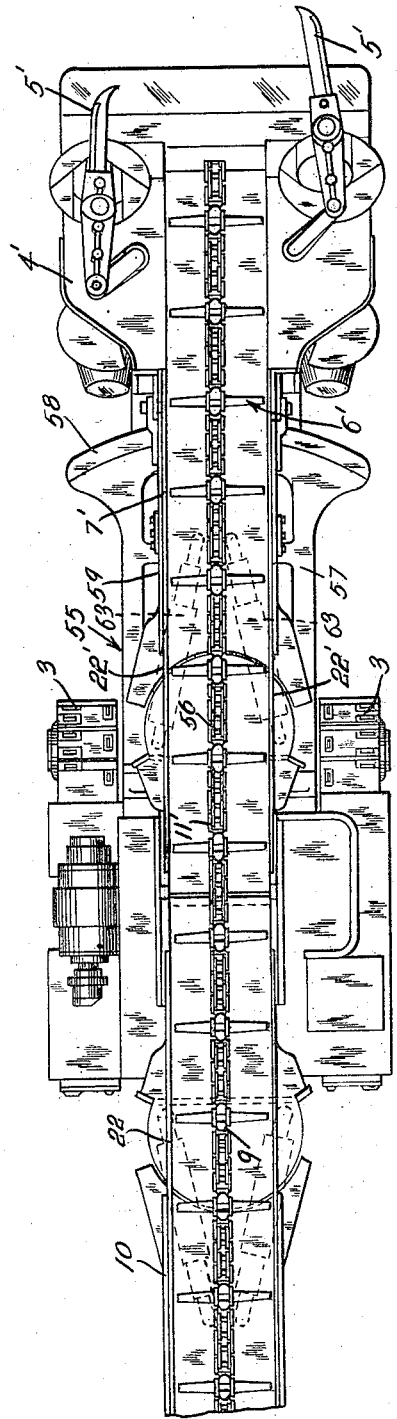
Fig. 5 is a plan view and Fig. 6 is a side view of a mobile loading machine in which a modified embodiment of the invention is incorporated, with the rear portion of the conveyor broken away.
Figure 6:
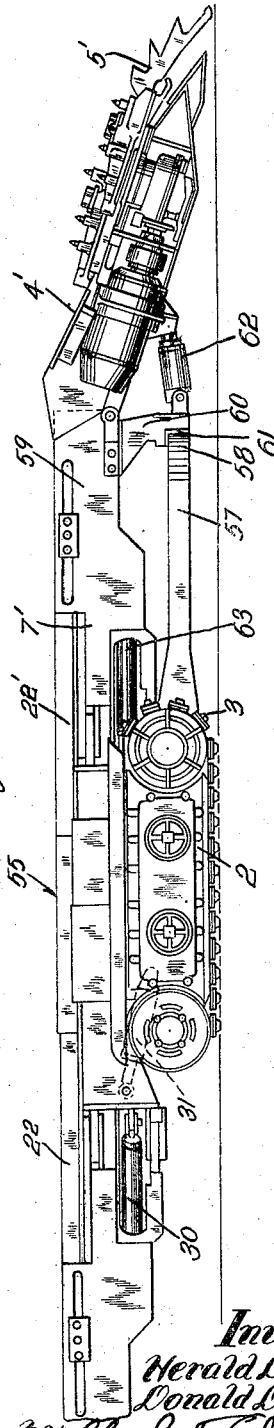

Now referring to the hydraulic fluid system shown diagrammatically in Figure 4, it will be noted that fluid jacks 30 are provided for swinging the rear conveyor frame and that the conveyor frame may be tilted by fluid jacks 31. Fluid jacks 32 serve to tilt the loading head and the forward portion of the conveyor. A motor driven pump 33 has its suction side connected by a conduit 34 to a liquid reservoir or tank 35 and the discharge side of the pump is connected by a conduit 36 to the pressure passages of a valve box 37 of a conventional control valve mechanism; the discharge passage of this discharge box being connected by a return conduit 38 back to the tank. This valve box has usual parallel bores containing conventional slide valves 39, 40 and 41 each having a suitable control handle 42. The bore containing the slide valve 41 is connected by a conduit 43 to the head tilt jacks 32 while the bore containing the slide valve 40 is connected by a conduit 44 to the tilt jacks 31 for the rear conveyor frame 10. The bore containing the slide valve 39 is connected by conduits 45 and 46 to branch conduits 47 leading to the swing jacks 30 for the rear conveyor frame and these branch conduits have oppositely acting check valves 48 and 49 connected respectively therein. The branch conduits 47 communicate with a conduit 50 which is connected to the branch conduits 47 intermediate the check valves 48 and 49, as shown, and this conduit 50 leads to the inner ends of the cylinders 26 of the rear take-up jacks 25. A conventional relief valve 51 set to open at a predetermined pressure is connected in the conduit 50 for relieving excessive pressure in the take-up and swing jacks and this relief valve is connected by a return conduit 52 back to the tank. The check valves 48 and 49 serve to trap the pressure fluid in the take-up cylinders 25 when fluid flowing through the conduits 45 and 46 is interrupted by the slide valve 39 and even when these conduits are connected to exhaust pressure fluid cannot escape from the conduit 50 past the check valves. The relief valve 51 provides the sole vent for the fluid trapped in the take-up cylinders. The pressure of the fluid in the take-up jack cylinders 26, due to the conduit connections disclosed, is the same as that in the jack cylinders for effecting lateral swing of the rear conveyor frame and is slightly in excess of the maximum pull on the conveyor chain 11. The relief valve 51 is set to open at a predetermined pressure slightly higher than the required swing-pressure in the jacks 30 and the maximum chain-pull pressure.

The slide valve 39 may be positioned to supply liquid under pressure to one or the other of the swing jacks 30 while the other swing jack is connected to exhaust and the check valves 48 and 49 alternatively act to prevent liquid flow to the swing jack which is then connected to exhaust. Simultaneously liquid under pressure flows through conduit 50 to the take-up jacks 25 to take up any slack introduced in the conveyor chain during such lateral swing. As the rear conveyor frame is swung laterally toward its central longitudinal position shown in Fig. 1, liquid is vented from the jack cylinders 26 past the relief valve 51 back to the tank so that the tension on the conveyor chain is to some extent relieved while a constant tension on the conveyor chain is maintained.

In the modified embodiment shown in Figures 5 to 10 inclusive, the mobile loading machine is generally designated 55 and is generally like that shown in Figures 1 and 2 with the main exception that the front conveyor frame and loading head are swingable laterally about a vertical axis 56 so that both ends of the conveyor may be swung laterally into different operating positions, in a well-known manner. In this construction, the tractor base 2 has a forward horizontal extension 57 provided with an arcuate front guide 58 and the front conveyor frame 7' is elongated at 59 and is provided with a depending frame 60 providing a guide 61 which engages the arcuate guide 58 during lateral swing of the loading head. In this instance, the loading head 4' is pivotally mounted on the frame extension 59 and is tiltable by hydraulic jacks 62. Front swing jacks 63 are provided for swinging the front conveyor frame 7' and the loading head laterally about the pivot 56. Due to the fact that both ends of the conveyor may be swung simultaneously laterally, a greater amount of slack is introduced in the conveyor chain 11' and the rear jacks 25 necessarily have to move farther to the left in Fig. 7 to maintain the desired chain tension. As in the embodiment above described, there are arranged at opposite sides of pivot 56 flexible side portions or plates 22', similar to the side plates 22, which are adapted to flex or bend laterally as the front conveyor frame is swung laterally about the pivot 56 and, as in the other embodiment, as these plates flex laterally, the conveyor chain has slack introduced therein which must be taken up by the rear take-up jacks to provide for proper tension of the conveyor. As in the other embodiment, the rear portion of the conveyor is tiltable in vertical planes about a transverse pivot indicated at 64 (Figs. 8 and 9).

Now referring to the hydraulic fluid system shown diagrammatically in Figure 10, it will be noted that the valve box 37' is provided with an additional bore containing a slide valve 65 and this bore is connected by conduits 66 and 67 to the front swing jacks 63 respectively. These conduits 66 and 67 are connected to branch conduits 68 and 69 which have oppositely acting check valves 70 and 71 connected therein, in a manner similar to the check valves 48 and 49 for the rear swing jacks 30. A conduit 72 communicates with the branch conduits 68 and 69 intermediate the check valves 70 and 71 and this conduit 72 leads to the conduit 50 which is connected to the rear take-up jacks 25. It is therefore evident that when the front conveyor frame 7' and the loading head are swung laterally about the pivot 56 by the front swing jacks 63, pressure fluid may flow past one or the other of the check valves 70 and 71 through the conduit 72 to the take-up jacks 25 so that any slack introduced in the conveyor chain 11' may be automatically taken up to maintain the proper chain tension. When the front and rear ends of the conveyor are simultaneously swung laterally about their pivots by the swing jacks 30 and 63, liquid under pressure may flow through one or the other of the pairs of check valves 48, 49 and 70, 71 through the conduits 72 and 50 to the take-up jack cylinders 26 automatically to take up the additional amount of slack introduced in the conveyor chain. As in the other embodiment, the relief valve 51 is set to relieve excessive pressures in the conduits 50 and 72 during lateral swing and as the conveyor is swung laterally toward its central position liquid is vented from the jack cylinders 30 and 63 past this relief valve so that the tension on the conveyor chain is reduced.

As a result of this invention an improved conveyor of the endless chain, flight type is provided wherein proper tension of the conveyor chain is maintained during lateral swing of an end portion of the conveyor. Further, by the provision of the improved automatic take-up, any slack introduced in the conveyor chain during lateral swing of either end portion of the conveyor may be automatically taken up even in the event such lateral swing of the conveyor-ends occurs simultaneously. The improved hydraulic take-up is so coordinated with the conveyor swinging means that tensioning of the conveyor chain is not only effected efficiently but also smoothly and in a simple and reliable manner. These and other advantages of the invention will be clearly apparent to those skilled in the art.

While there are in this application specifically described two forms which the invention may assume in practice, it will be understood that these forms of the same are shown for purposes of illustration and that the invention may be further modified and embodied in various other forms without departing from its spirit or the scope of the appended claims.

What we claim and desire to secure by Letters Patent is:

1. In a conveyor having a laterally swingable end portion and an endless conveyor element guided thereon, a fluid operated means for swinging said end portion laterally in either direction from a central point, said swinging means including relatively oppositely acting, single acting swing jacks, and shiftable control means for supplying pressure fluid to said swing jacks for effecting alternate operation thereof, a fluid operated take-up acting on the endless conveyor element and including single acting fluid operated take-up jacks, means for connecting said take-up jacks to said fluid supply means for control thereby, and means for coordinating said take-up with said swinging means and effective whenever fluid is supplied to the latter for automatically taking up any slack introduced into the conveyor element during swing in either direction as aforesaid for maintaining the proper tension of said element, said coordinating means including check valve means in said fluid supply means for effecting fluid supply to said take-up jacks only during alternate operation of said swing jacks and operative to trap the fluid in said take-up jacks irrespective of the shifted position of said control means.

2. A conveyor as set forth in claim 1 wherein pressure relief valve means is connected to said fluid operated take-up between the latter and said check valve means for preventing the building up of excessive pressures and constituting the sole means past which fluid trapped by said check valve means may flow from said take-up as said end portion of said conveyor is swung back toward its central position.

3. A conveyor as set forth in claim 1 wherein said check valve means comprises oppositely acting check valves connected in the fluid supply to said single acting swing jacks for preventing simultaneous operation of said swing jacks during fluid supply to said take-up jacks.

4. A conveyor as set forth in claim 3 wherein said pressure relief valve means is connected to the fluid supply intermediate said check valves for preventing the building up of excessive pressures in said take-up jacks and said swing jacks and for venting said take-up jacks as said end portion of said conveyor is swung toward its central position.

5. In a flight conveyor having laterally swingable front and rear end portions and an endless conveyor element guided thereon, a pair of single acting fluid jacks for swinging said conveyor end portions in either direction, shiftable control means for effecting alternate operation of said jacks, single acting fluid jacks for taking up any slack introduced in the endless conveyor element as either or both of said end portions are swung laterally, conduit means connected to said control means for supplying fluid to said take-up jacks, and oppositely acting check valves arranged between said conduit means and each pair of swing jacks for effecting flow of fluid alternatively to said swing jacks of each pair upon fluid supply thereto and to said take-up jacks by said operating effecting means, said check valves serving to trap fluid in said take-up jacks irrespective of the shifted position of said control means and operative even when fluid flow to said swing jacks is interrupted to maintain the proper chain tension.

6. A conveyor as set forth in claim 5 wherein a relief valve is connected in said conduit means for relieving excessive pressure in said swing jacks and said take-up jacks and for venting the latter whenever either of said end portions is swung toward its central position.

7. In a conveyor having a laterally swingable end portion and an endless conveyor element guided thereon, fluid operated devices for swinging said end portion of said conveyor in either of opposite directions, valve controlled passage means for supplying fluid under pressure to either one of said fluid operated devices while connecting the other to exhaust, fluid operated take-up means acting on said endless conveyor element for maintaining the latter under proper tension as said end portion is swung laterally from its central position, passage means for conducting pressure fluid from said first mentioned passage means to said take-up means whenever a fluid operated device is operated to effect swinging of said conveyor end portion, and check valve means for preventing flow of pressure fluid from said second mentioned passage means to the fluid operated device which is connected to exhaust irrespective of the direction of swing of said conveyor end portion from its central position, said check valve means trapping the fluid in said take-up means when the fluid supply in said passage means to said fluid operated swinging devices is interrupted.

8. A conveyor as set forth in claim 7 wherein relief valve means is connected to said second mentioned passage means for discharging fluid from said take-up means whenever said conveyor end portion is swung back toward its central position, said relief valve means constituting the sole vent for said take-up means when fluid flow through said passage means is interrupted.

References Cited in the file of this patent
UNITED STATES PATENTS

| | | |
|---|---|---|
| 2,527,452 | Rose | Oct. 24, 1950 |
| 2,665,794 | Slomer | Jan. 12, 1954 |